United States Patent [19]
Wada et al.

[11] Patent Number: 5,513,818
[45] Date of Patent: May 7, 1996

[54] TAPE WINDING APPARATUS INCLUDING CASSETTE INFORMATION DETECTOR

[75] Inventors: Kengo Wada; Yuji Sakuma; Shinichi Nomura, all of Chofu, Japan

[73] Assignee: Otari, Inc., Chofu, Japan

[21] Appl. No.: 212,279

[22] Filed: Mar. 14, 1994

[30] Foreign Application Priority Data

Mar. 19, 1993 [JP] Japan .................................. 5-060566

[51] Int. Cl.$^6$ .................................................. B65H 75/28
[52] U.S. Cl. .................... 242/532.1; 242/534; 242/534.2
[58] Field of Search ........................ 242/532.1, 534, 242/534.2

[56] References Cited

U.S. PATENT DOCUMENTS

| | | | |
|---|---|---|---|
| 3,814,343 | 6/1974 | Bennett et al. | 242/534.2 |
| 4,436,251 | 3/1984 | Deyesso et al. | 242/532.1 |
| 4,632,327 | 12/1986 | Kreeft et al. | 242/532.1 |
| 4,657,197 | 4/1987 | Farrow | 242/534 |
| 4,679,744 | 7/1987 | Chikamasa et al. | 242/534 |
| 4,836,464 | 6/1989 | Perego | 242/532.1 |
| 5,067,215 | 11/1991 | Behl et al. | 242/534 |
| 5,125,587 | 6/1992 | Perego | 242/532.1 |
| 5,152,473 | 10/1992 | Perego | 242/532.1 |
| 5,181,667 | 1/1993 | Farrow et al. | 242/532.1 |
| 5,402,961 | 4/1995 | Kita | 242/532.1 |

*Primary Examiner*—Daniel P. Stodola
*Assistant Examiner*—William A. Rivera
*Attorney, Agent, or Firm*—Knobbe, Martens, Olson & Bear

[57] ABSTRACT

A tape winding apparatus, for winding a certain length of magnetic tape in a cassette, comprises a detection unit and a cassette distributor. The detection unit detects the existence of holes on the cassette, which are regarded as information used in winding the magnetic tape. The winding operation of the winding station is controlled by the information received from the detection unit. If the information set by a controller and the information detected by the detection unit do not match, the cassette is regarded as defective and is distributed to the appropriate location by the cassette distributor.

5 Claims, 7 Drawing Sheets

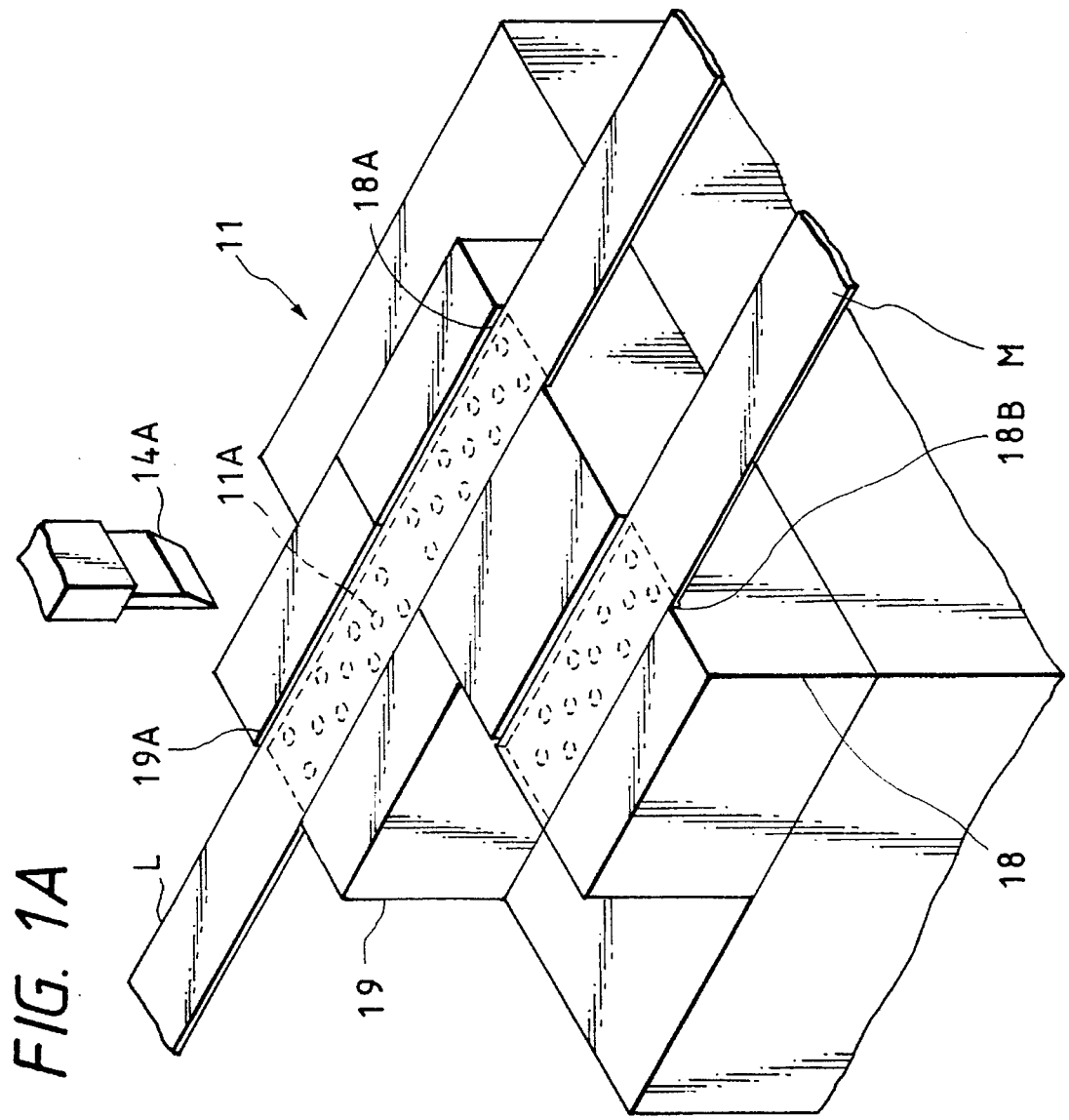

TAPE WINDING APPARATUS INCLUDING CASSETTE INFORMATION DETECTOR

BACKGROUND OF THE INVENTION

1. Field of the Invention

This invention relates to a tape winding apparatus for winding a certain length of tape, such as a magnetic tape, inside a cassette.

2. Description of the Prior Art

The tape winding apparatus is used for producing marketable cassettes in which video tapes, audio tapes and ribbon tapes are wound. This tape winding apparatus can be classified into two types: one that directly winds a tape, for example a magnetic tape, onto a hub which is stored in a cassette beforehand; and, one that winds the magnetic tape onto the hub before it is stored in the cassette.

The first type is disclosed in the Japanese Patent Laid-Open No. 4-47577. This conventional apparatus is comprised of: a tape supply means which continuously forwards the magnetic tape by holding and rotating a reel in which the length of magnetic tape is wound; a winding station which winds the forwarded magnetic tape on the hub inside the cassette; and, a cassette ejecting means which ejects the cassette when the magnetic tape in the cassette has been completely wound by the winding station.

In addition, the conventional apparatus includes a setting means which sets up the tape winding operation by inputting information, such as winding length, winding speed, winding tension and type of magnetic tape, so as to wind the magnetic tape on the hub inside the cassette. The information is manually input utilizing keyboards or switches.

Conventional tape winding apparatus have no problems as long as similar lengths of magnetic tape are wound on similar types of cassettes. However, when a variety of cassettes are produced in small amounts, a great deal of labor is required to meet the many different winding conditions. As a result, many errors are made in inputting the information during the setting means.

Another disadvantage associated with conventional tape winding apparatus is that, during production, the many different types of cassettes often get mixed together. Therefore, all products have to be inspected after production. In addition, if a long magnetic tape is accidentally wound on a small cassette, the cassette may get damaged and the tape winding apparatus will stop functioning.

OBJECT AND SUMMARY OF THE INVENTION

The object of the present invention is to solve the above-mentioned problems and provide a tape winding apparatus which does not require excessive labor in meeting various winding conditions and which inputs information without causing any errors. Another object is to provide a tape winding apparatus which can deal with a variety of cassettes.

In order to solve the above problems, the tape winding apparatus of the present invention, having a winding station for winding a desired length of the tape inside a cassette, is comprised of:

a detection means for detecting identification information for winding the tape which is accommodated in the cassette; and, a control means for controlling the winding operation in the winding station based on the information received from the detection means.

The tape winding apparatus further includes a distribution means which distributes various types of cassettes. The control means commands the distribution means, based on the information from the detection means, to distribute cassettes so that tapes are wound by the winding station.

In another embodiment of the present invention, a tape winding apparatus for winding a tape of desired length inside a cassette is comprised of:

a winding station for winding tapes in the cassette;

a setting means for setting up winding conditions in said winding station by inputting information so as to wind the tape in the cassette;

a control means for controlling the winding operation of the winding station based on the setting conditions of said setting means;

a detection means for detecting identification information provided in the cassette which is regarded as the winding information of the tape; and, a distribution means for distributing various types of cassettes.

The control means prevents the winding station from performing the winding operation and sends the cassette to the distribution means when the winding information, set by the setting means, and the identification information, detected by the detection means, do not match.

The detection means consists of a plurality of optical sensors which detect whether or not a plurality of holes are provided on the cassette surface. The plurality of holes serve as the identification information.

In addition, the detection means is comprised of a bar code reader which detects the bar code provided on the cassette surface. The bar code also serves as part of the identification information.

Furthermore, the detection means is comprised of a reading apparatus which reads out the stored information provided on the cassette surface. The stored information is also part of the identification information.

The tape winding apparatus of the present invention has several advantages. One advantage is that the winding conditions can be easily altered, thereby preventing a decrease of production efficiency caused by input errors. Another advantage is that present invention can simultaneously convey and distribute a variety of cassettes produced in small amounts.

In addition, even if different types of cassettes are accidentally mixed together, it is possible for the present invention to eliminate the wrong cassettes by detecting the identification information and distributing the cassettes. Therefore, an accident which would typically halt the production line is prevented. Finally, due to the detection means, there is no need to count the total number of completed cassettes.

BRIEF DESCRIPTION OF THE DRAWINGS

FIG. 1A is a cross sectional view of a shift block of the tape winding apparatus of the present invention.

DESCRIPTION OF THE PREFERRED EMBODIMENTS

Figure 4:
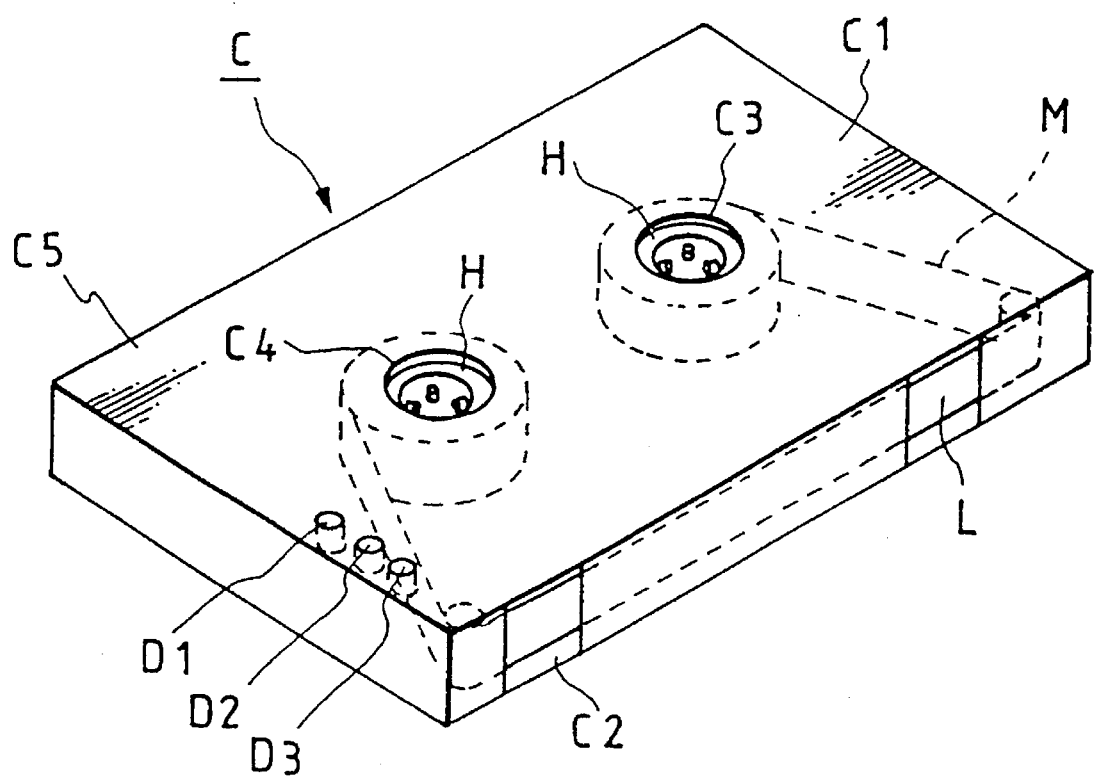
FIG. 4 is a view showing a basic structure of the cassette.

The preferred embodiment of the tape winding apparatus of the present invention is described as follows. FIG. 4 shows the basic structure of a cassette C before the magnetic tape is wound by the tape winding apparatus.

The cassette C, shown in FIG. 4, is an audio tape cassette comprised of: a case C1, a pair of hubs H stored in the case C1, and a leader tape L connected to the pair of hubs H. Winding shafts, engaged in the pair of hubs H, and a magnetic head are located at the site of the windows C2, C3 and C4, which are provided in the case C1. As a result, the leader tape L and magnetic tape M are wound from outside. Further, three holes D1, D2 and D3 are provided on a surface C5 of the case C1 as identification information. Combinations of these holes D1, D2 and D3 indicate the length of magnetic tape M stored therein. For example, the holes arranged in an order of D1, D2 and D3 indicates a sequence of "short", "medium" and "long".

Figure 2:
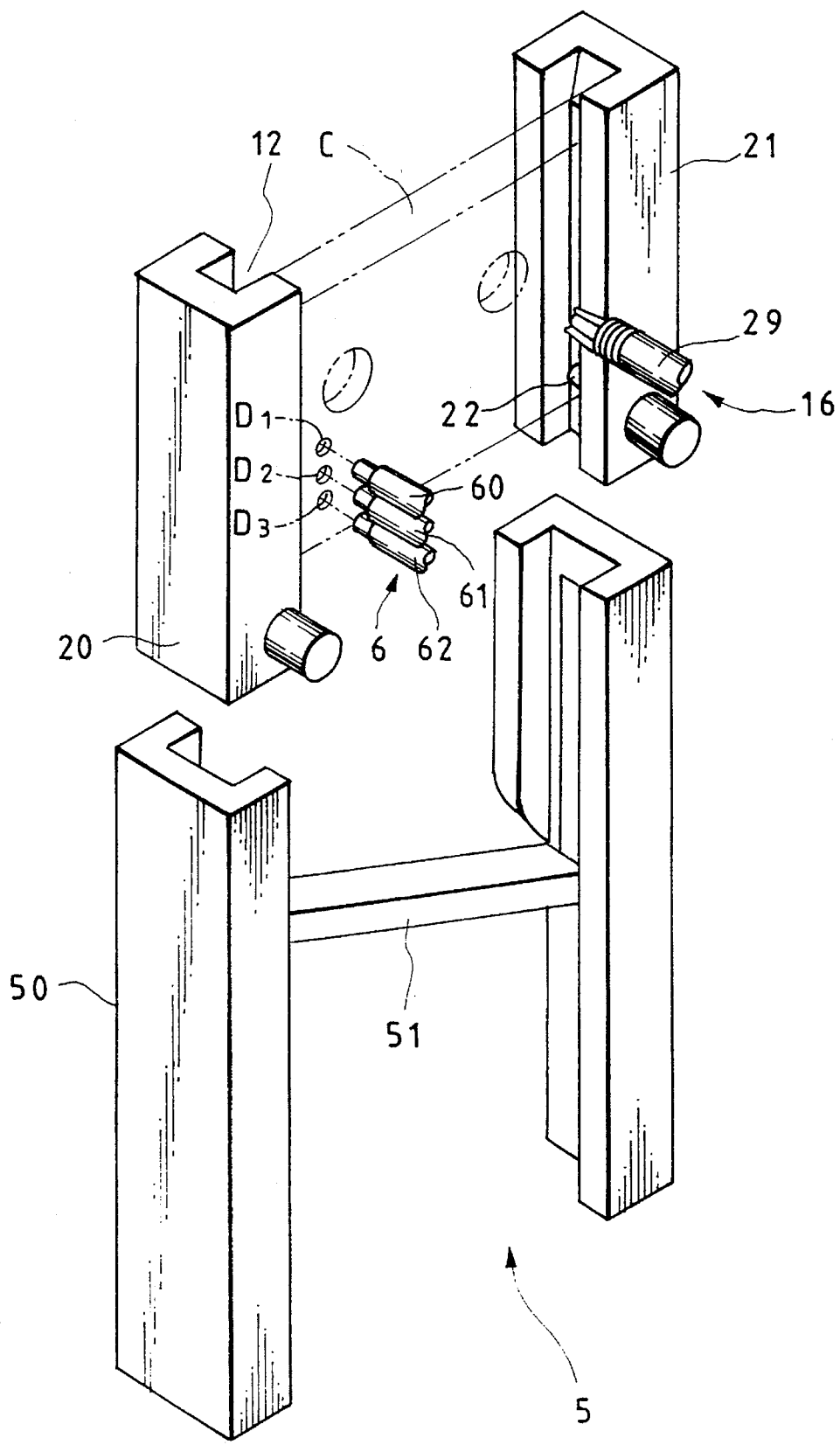
FIG. 2 is a schematic view of a cassette holder, a winding mechanism, a detection means and a distributing means, as viewed from a base panel side.

FIG. 2 shows a schematic view of a cassette holder 12, a winding mechanism 16, a detection means 6 and a distribution means 5, as viewed from a base panel side.

Figure 1:
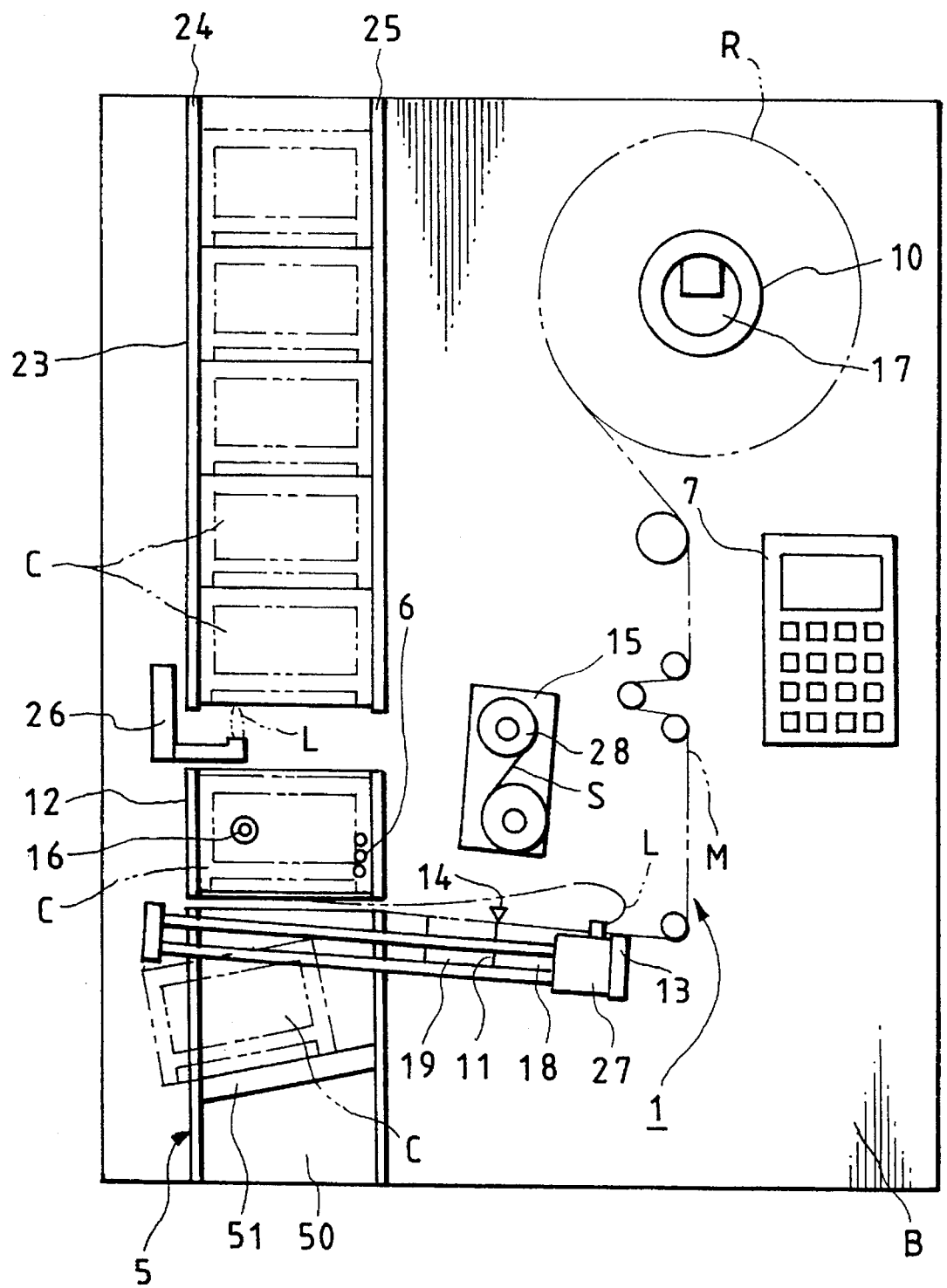
FIG. 1 is a schematic view of the preferred embodiment of the tape winding apparatus of the present invention.

The tape winding apparatus of the present invention, as shown in FIG. 1, includes a winding station 1 which winds the magnetic tape M within the cassette C. The winding station 1 is comprised of: a reel plate 10, a shift block 11, the cassette holder 12, a leader tape pullout mechanism 13, a cutter mechanism 14, a splicing mechanism 15 and a winding mechanism 16. These components enable the winding station 1 to pull out and cut the leader tape L, which is connected beforehand to the pair of hubs H. The cut end of the leader tape L is connected to the end of the magnetic tape M so that, when the hubs H are rotated, the magnetic tape M is wound.

The reel plate 10 is comprised of a removable clamper 17 and a motor (not shown), which continuously forwards the magnetic tape M. The removable clamper 17 holds a reel R onto which the length of magnetic tape M is wound.

The shift block 11 includes two blocks 18 and 19, as shown in FIG. 1A. The block 18, shown in the right-hand side in the drawing, includes two grooves 18A and 18B, whose widths are equivalent to that of the magnetic tape M. The other block 19 includes a groove 19A whose width is equivalent to the width of grooves 18A and 18B. Each groove is parallel to the base panel B. Furthermore, when the right block 18 shifts to either the right or left direction against the base panel B, the groove 19A of the other block 19 is aligned with either of the grooves 18A or 18B. These grooves include a plurality of holes 11A, whereby the magnetic tape M and the leader tape L can be held by air suction.

As shown in FIG. 2, the cassette holder 12 holds the cassette C by surrounding the cassette with side plates 20 and 21 and supporting the bottom of the cassette with a projectable pair of pins 22. When these pins 22 are pulled in, the cassette C is ejected and falls down.

Referring to FIG. 1, the cassette supply mechanism 23, located above the cassette. holder 12, is comprised of two rails 24 and 25. A plurality of cassettes C may be held between these rails 24 and 25. The cassettes are sequentially conveyed to the cassette holder 12 by a free fall effect.

The leader tape pullout mechanism 13 is comprised of a suction mechanism 26 and a placement mechanism 27. The suction mechanism 26 partially pulls out the leader tape L from the cassette C by utilizing a suction feature. The placement mechanism 27 places the leader tape L on the shift block 11 by inserting a pullout pin (not shown) into a hole of the leader tape and pulling the leader tape.

The cutting mechanism 14 is comprised of a blade 14A and a reciprocating drive source (not shown), which reciprocates on the blade 14A. The cutting mechanism 14 cuts the magnetic tape M or the leader tape L, which is held on the shift block 11 by suction means.

The splicing mechanism 15 attaches the magnetic tape M to the leader tape L. The splicing mechanism cuts the splicing tape S, which is wound on a reel 28, to a predetermined length and moves it to the shift block 11. The splicing mechanism then attaches the splicing tape S, thereby coupling the magnetic tape M to the leader tape L.

As shown in FIG. 2, the winding mechanism 16 is comprised of: a winding shaft 29, whose end is adapted to engage with the hub H; a moving mechanism (not shown) for moving the winding shaft 29, so as to engage it with one of the hubs H of the cassette C which is held in the cassette holder 12; and, a motor (not shown) for rotating the winding shaft 29, whereby the hub H is rotated and the magnetic tape M is wound.

Next, the operation of the winding station 1 of the preferred embodiment of the present invention will be described, with reference to FIGS. 1 and 1A.

First, the magnetic tape M is pulled out from the reel plate 10. The end of the magnetic tape is held by suction in one of the grooves of the right block 18 of the shift block 11. Next, the leader tape L is partially pulled out from the cassette C, which is located at the bottom of the cassette supply mechanism 23, by means of the suction mechanism 26. Then, the cassette C falls or drops from the cassette supply mechanism 23 into the cassette holder 12. The leader tape pullout mechanism 13 then pulls the leader tape L from the cassette C and places it on the shift block 11.

With the leader tape L on the shift block 11, the cutting mechanism 14 cuts the leader tape L. The shift block 11 then shifts the right block 18 so that the cut end of the leader tape L contacts an end of the magnetic tape M. The splicing mechanism 15 connects the attached magnetic tape M and the leader tape L. At this point, the shift block 11 releases the suction on the attached tapes M and L. Finally, the winding mechanism 16 winds the magnetic tape M by rotating one of the hubs H of the cassette C.

After winding a certain length of the magnetic tape M, the winding mechanism 16 stops the rotation of the hub H. Once again, the shift block 11 holds the magnetic tape M by suction and the cutting mechanism 14 cuts the magnetic tape M. The shift block 11 then shifts the right block 18 so that the cut end of the leader tape L, which is suction-held by the other block 19, contacts the cut end of the magnetic tape M, which is wound in the cassette C. Next, the splicing mechanism 15 attaches the magnetic tape M to the leader tape L.

At this point, the shift block 11 releases the suction on the attached magnetic tape M and leader tape L. Once again, the winding mechanism 16 rotates the hub H so as to rewind the magnetic tape M and the leader tape L onto the cassette C. Finally, the completed cassette is ejected from the cassette holder 12. By repeating the previously described operation, cassettes may be continuously produced.

The following describes operations of the other mechanisms. As shown in FIG. 2, the distribution means 5 is comprised of a chute plate 50 and a sloped plate 51. Two conditions, a projecting (an interfering) condition and a non-projecting (non-interfering) condition, can occur at the distribution means 5. When the sloped plate 51 does not project across the chute plate 50, the cassettes C, ejected from the cassette holder 12, fall smoothly through the chute plate 50 without experience any interference. The cassettes C are then ejected to the outside conveyer. When the sloped plate 51 does project across the chute plate 50, the cassettes C, ejected from the cassette holder 12, fall onto the sloped plate 51 and are ejected in a different direction. The ejected cassettes C are then stored in a different place.

As shown in FIG. 2, the detection means 6 is comprised of three optical sensors 60, 61 and 62. The sensors detect the existence of holes D1, D2 and D3 in the cassette C held in the cassette holder 12. Combinations of the holes D1, D2 and D3 indicate various winding information, such as the length of magnetic tape M written in the cassette C.

The setting means 7, shown in FIG. 1, consists of a plurality of switches and a keyboard and is operated from outside. The winding information, such as the length of the magnetic tape M, a winding speed or a tension for winding the tape in the cassette C, is input therein.

Figure 3:
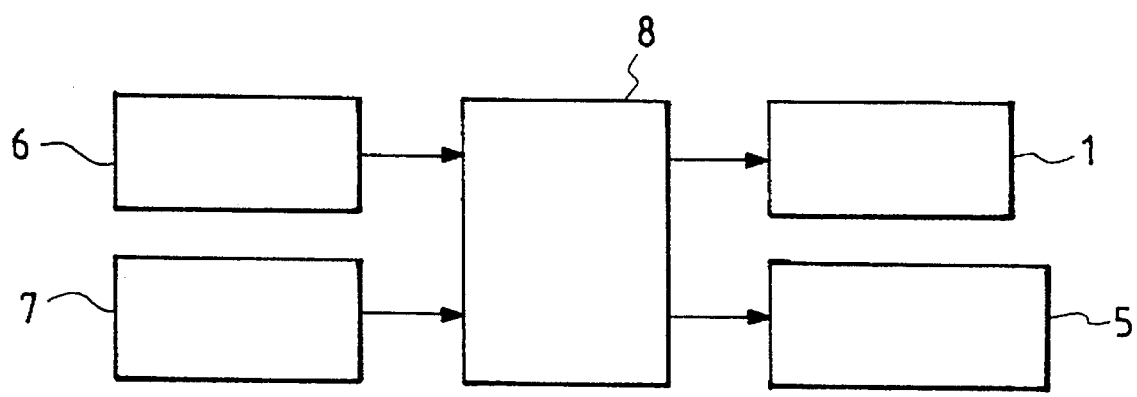
FIG. 3 is a block diagram showing the tape winding mechanism of the present invention.

The control means 8 is comprised of a micro processor. As shown in FIG. 3, the control means 8 controls the operations of the winding station 1 and the distribution means 5 based upon the information received from the detection means 6 and the setting means 7. The control means 8 instructs the winding station 1 to begin the winding operation, based upon the information received from the detection means 6. In addition, the control means 8 instructs the distribution means 5 to distribute different types of cassettes based upon the information received from the detection means 6. Alternatively, the control means 8 compares the information received from the setting means 7 and the detection means 6. If they do not match, the control means 8 discontinues the winding operation and instructs distribution means 5 to eject the cassette C therefrom.

The above-described winding apparatus can perform the following two operations. In the first operation, the detection means 6 detects whether or not there are holes D1, D2 and D3 on the cassette C. Based upon this information, the control means 8 determines the length of magnetic tape M to be wound in the cassette C by the winding station 1. Then, that length of magnetic tape M is wound in the cassette C.

This operation allows the magnetic tape M, being of varying lengths, to be wound in a variety of cassettes C without setting winding conditions. Thus, the separation of completed cassettes C, based upon the lengths of the magnetic tape M, is not necessarily needed for this operation.

In the second operation, the setting means 7 sets up winding conditions, such as the winding lengths, of the winding station 1. Next, the detection mean 6 detects whether or not there are three holes D1, D2 and D3 provided on the cassette C. The control means 8 compares the winding length information set by the setting means 7 and the winding length information detected by the detection means 6. If the information does match, the winding operation proceeds so as to complete genuine cassette products. However, if the information does not match, the cassette C is considered to be defective and is led to the distribution means 5; then, it is ejected therefrom. Therefore, this operation prevents different types of cassettes being mixed together.

Figure 5:
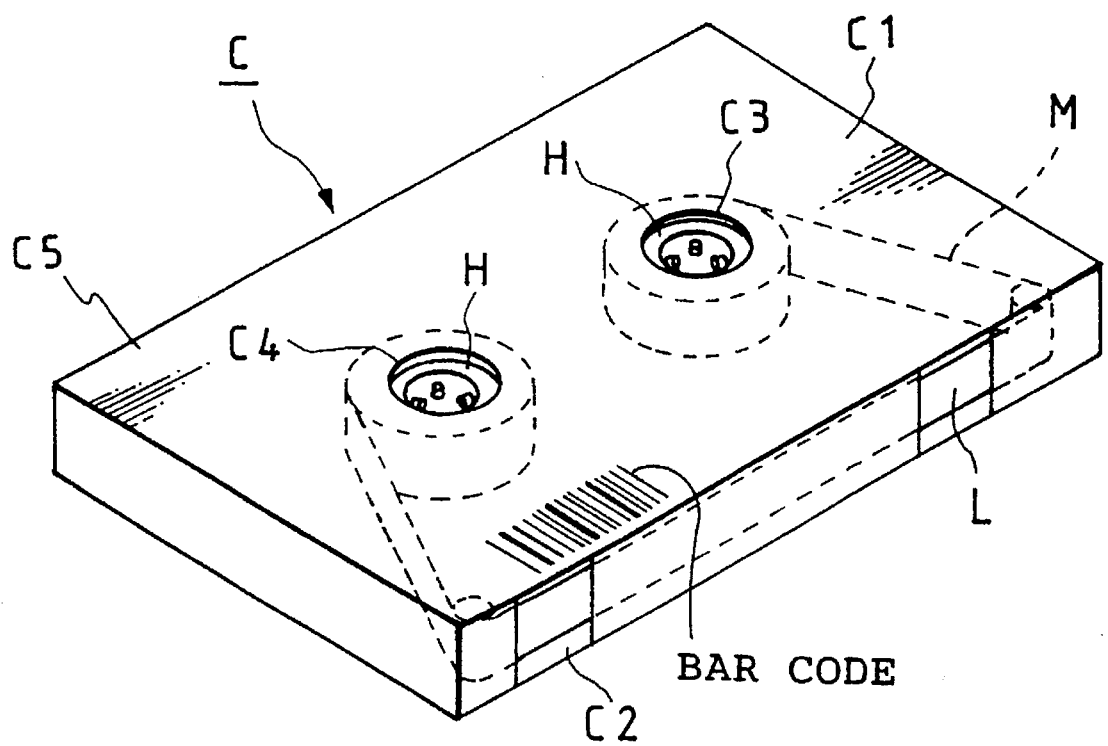
FIG. 5 is a view showing and example of cassette having a bar code on its surface.
Figure 6:
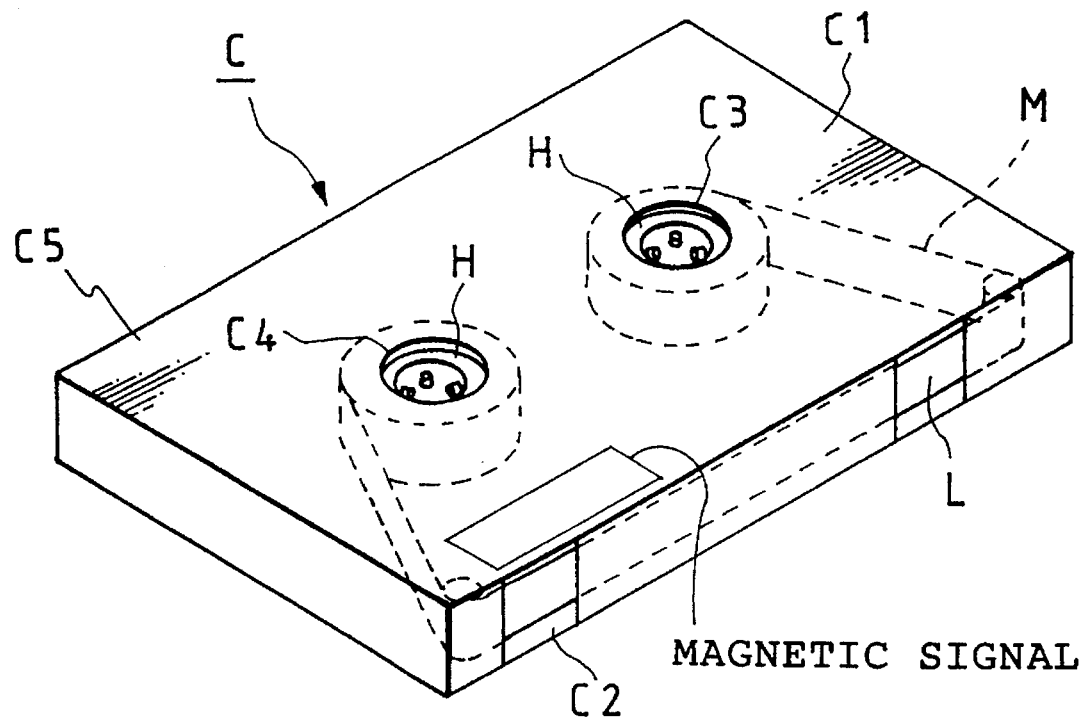
FIG. 6 is a view showing an example of cassette having a magnetic signal on its surface.

In addition, the detection means can be formed of a bar code reader which detects a bar code provided on the cassette surface, Futhermore, the detection means can be comprised of a reading apparatus which reads the stored information provided on the surface of the cassette surface such as a magnetic means. FIGS. 5 and 6 show each examples of cassette having a bar code and a means for storing a magnetic signal, respectively, indicating the identification information on their surfaces.

Obviously, numerous variations and modifications can be made without departing from the spirit of the present invention. Therefore, it should be clearly understood that the forms of the present invention described above and shown in the figures of the accompanying drawings are illustrative only and are not intended to limit the scope of the present invention.

In another embodiment of the present invention, the detection means is defined as a means for detecting the identification information which indicates length of magnetic tape M (depending upon the arrangement of the holes D1, D2 and D3). However, other information, such as winding speeds and tension of the magnetic tape, can also be included in the identification information.

In the preferred embodiment, a plurality of holes was provided on the cassette surface as the identification information of the cassette C. However, as an alternate embodiment, memory information or the like is provided on the cassette C. The information is stored in the form of bar codes or electro-magnetic induction. For this embodiment, the detection means 6 is a reading apparatus used for detecting the information.

In the preferred embodiment, the detection means 6 was accommodated in the cassette holder 12 so as to detect the identification information of the cassettes C. The distribution of cassettes C was performed at the lower side of the cassette holder 12. In yet another embodiment, it is also possible to provide the detection means 6 and the distribution means 5 under the cassette supply means 23 so that they detect the identification information of the cassettes C and distribute them therefrom. In this case, if a cassette is found to be defective, that cassette C can be pushed in either the right or left direction and removed from the cassette supply means 23. With this method, the detection and distribution of cassettes C can be performed while the magnetic tape M is being wound in the cassette. Therefore, production efficiency is improved.

In the preferred embodiment, the distribution means 5 was adapted to distribute the cassettes using the chute plate 50 and the sloped plate 51. In another embodiment, however, the chute plate 50 is arranged to be able to distribute cassettes in several directions, such as right, left, front or back. Thus, a wider variety of cassettes can be separated and distributed thereby.

In the preferred embodiment, the cassettes C are defined as audio tapes. However, other types of tapes, such as video tapes, ribbon tapes or the like, may also be used.

What is claimed is:

1. A tape winding apparatus for a magnetic tape, comprising:

a cassette provided with identification information representing a length of magnetic tape to be wound in said cassette;

a winding station for receiving said cassette and winding a desired length of said magnetic tape inside said cassette, said magnetic station pulling out a source of magnetic tape wound on a reel and supplying said magnetic tape to said cassette for winding;

a detector for detecting said identification information provided with said cassette;

a controller for controlling a winding operation in said winding station, said controller receiving said identification information from said detector and instructing said winding station said length of said magnetic tape to be wound in said cassette; and a cassette distributor which classifies various types of cassettes that have been wound with said magnetic tape therein in response to instructions from said controller which is based on said identification information from said detector, said distributor distributing said cassettes to corresponding positions of said tape winding apparatus in accordance with said classification.

2. A tape winding apparatus for winding a tape inside a cassette of a desired length, said cassette provided with identification information representing a length of magnetic tape to be accommodated in said cassette, said apparatus comprising:

a winding station for pulling out a magnetic tape on a reel and winding the pulled-out magnetic tape inside said cassette;

a setting means for setting up winding conditions in said winding station by inputting information for winding said tape in said cassette;

a control means for controlling a winding operation of said winding station based on said winding conditions of said setting means;

a detector for detecting identification information provided with said cassette as said winding conditions for said tape; and, a distribution means for distributing cassettes to positions of said tape winding apparatus based on said identification information, wherein said control means prohibits said winding station from performing said winding operation and commands said winding station to transfer said cassette to said distribution means when the winding conditions set by said setting means and the identification information detected by said detector do not match.

3. A tape winding apparatus as defined in claims 1 or 2, wherein said identification information is expressed by a plurality of holes on said cassette, said detector consists of a plurality of optical sensors which detect whether or not a predetermined combination of said holes are provided on said cassette.

4. A tape winding apparatus as defined in claims 1 or 2, wherein said identification information is expressed by bar codes on said cassette, said detector detect said bar codes provided on said cassette.

5. A tape winding apparatus as defined in claims 1 or 2, wherein said identification information is expressed by magnetic signals stored on a surface of said cassette, said detector reads out said stored identification information provided on said cassette.

* * * * *